US007384259B2

(12) United States Patent
Prue

(10) Patent No.: US 7,384,259 B2
(45) Date of Patent: Jun. 10, 2008

(54) MECHANISM FOR ADJUSTING A VALVE FOR REGULATING THE FLOW OF PLASTIC TO AN EXTRUSION DIE

(75) Inventor: James M. Prue, Griswold, CT (US)

(73) Assignee: Guill Tool & Engineering Co, Inc., West Warwick, RI (US)

( * ) Notice: Subject to any disclaimer, the term of this patent is extended or adjusted under 35 U.S.C. 154(b) by 24 days.

(21) Appl. No.: 11/351,336

(22) Filed: Feb. 9, 2006

(65) Prior Publication Data

US 2007/0184142 A1    Aug. 9, 2007

(51) Int. Cl.
*B29C 47/06* (2006.01)
*B29C 47/92* (2006.01)
(52) U.S. Cl. .............................. 425/382.4; 425/133.1; 425/462; 425/463
(58) Field of Classification Search ................ 425/130, 425/132, 133.1, 133.5, 382.4, 462, 463
See application file for complete search history.

(56) References Cited

U.S. PATENT DOCUMENTS

| 3,901,636 | A | * | 8/1975 | Zink et al. ................ 425/378.1 |
| 4,081,231 | A | * | 3/1978 | Herrington ................... 425/464 |
| 4,395,217 | A | * | 7/1983 | Benadi' ................... 425/382 R |
| 6,971,865 | B2 | * | 12/2005 | Prue ....................... 425/192 R |

* cited by examiner

*Primary Examiner*—Robert B. Davis
*Assistant Examiner*—Joseph Leyson
(74) *Attorney, Agent, or Firm*—Perman & Green, LLP

(57) ABSTRACT

A manifold is connected between an extruder and the associated die assembly to supply plastic flow to the die. The output from the extruder is split into multiple passages in which each manifold passage supplies plastic flow to an extrusion passage within the die assembly. An adjustable throttle valve is positioned within each manifold passage to regulate the flow volume through the manifold passage, thereby controlling the output of the die assembly. An adjustment mechanism is constructed having a lever arm actuated by a screw to provide movement of a spring biased part of the valve to open and close a valve seat against a valve stem.

6 Claims, 2 Drawing Sheets

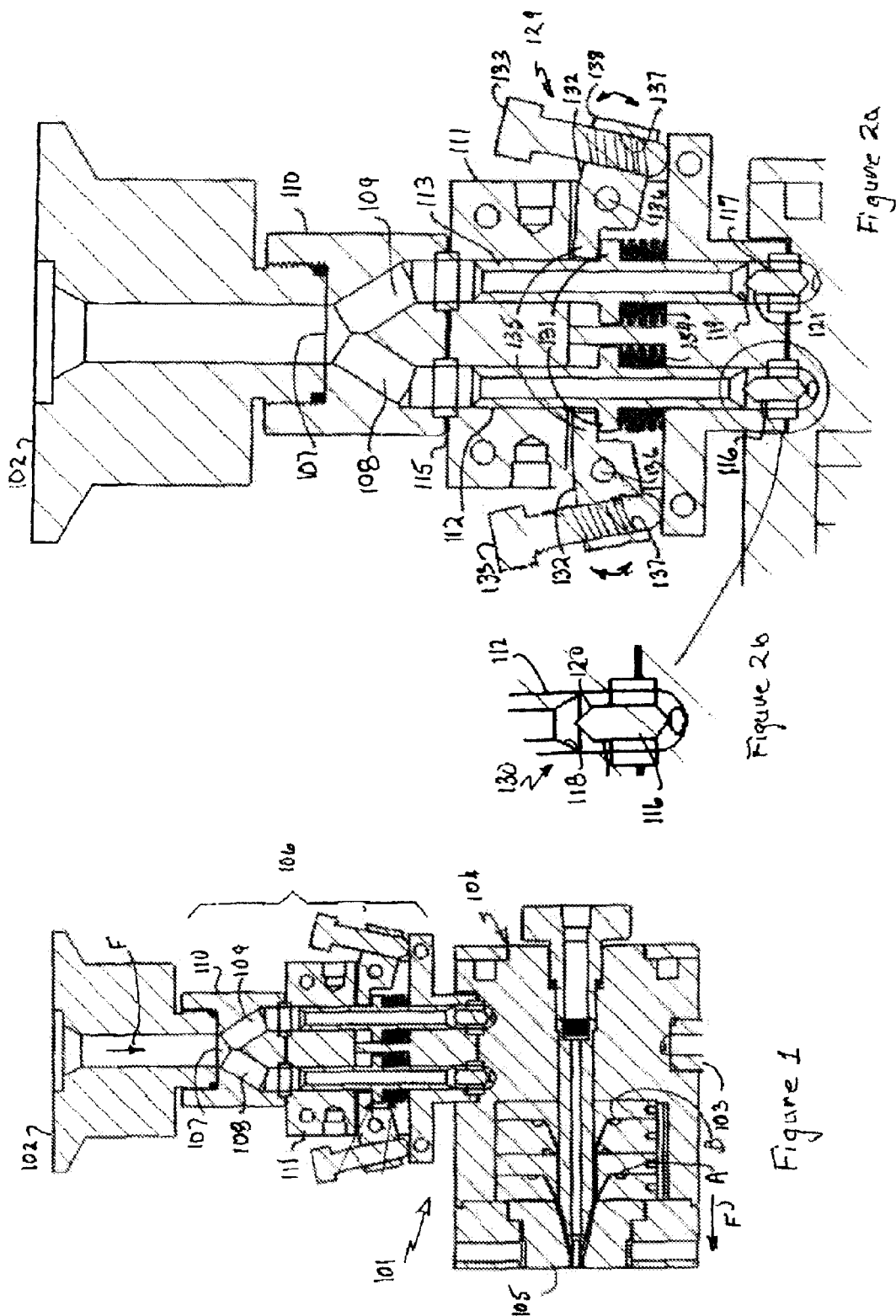

MECHANISM FOR ADJUSTING A VALVE FOR REGULATING THE FLOW OF PLASTIC TO AN EXTRUSION DIE

BACKGROUND OF THE INVENTION

1. Field of the Invention

The present invention relates to an assembly for regulating the volume of flow of molten plastic material from an extruder to a die having multiple flow passages.

2. Brief Description of Related Developments

In certain circumstances it is necessary to supply multiple passages of an extrusion die with molten plastic material. This is accomplished in many instances by providing separate extruders for the inlet of each of the multiple passages. This may be cumbersome where there are closely adjacent multiple passages and unnecessary where several of the flow passages are intended to use the same material.

It is an object of this invention to provide an inlet manifold connected to a single extruder which is constructed to split the outflow of the extruder into multiple extrusion passages of an extrusion die assembly.

Multiple passages are generally used to feed multiple extrusion channels which extrude separate products, concentric layers, or other configurations. In such circumstances, it is sometimes difficult to maintain an even flow volume in adjacent passages because of uneven temperature distribution and other factors. This may result in an imbalance in output. This imbalance can cause problems in post extrusion processing.

It is the purpose of this invention to provide a manifold which divides a single feed flow into multiple channels and includes an adjustable throttle valve to regulate the flow volume in the extrusion passages supplied by the extruder. A manifold of this type is described in U.S. Pat. No. 6,971,865 which issued on Dec. 6, 2005, the disclosure of which is incorporated herein in its entirety.

It is another purpose of this invention to construct a means for conveniently adjusting the valve position to accurately regulate the flow of plastic.

SUMMARY OF THE INVENTION

An input manifold is constructed with an inlet for receiving molten plastic material from an extruder. The inlet splits the flow into several flow passages, at least two, to supply flowing plastic to the extrusion passages of a die assembly. The extrusion passages direct the flowing plastic to the die outlets of the assembly. The manifold is constructed having spaced adjacent upstream and downstream sections. The manifold sections have aligned passages for receiving and transmitting the flowing plastic. Each passage of the downstream section is constructed with a stationery valve stem positioned along the axis of the passage and having a conically shaped upstream facing surface.

A valve body is constructed to be mounted in each of the passages and includes an axial channel. The valve body is mounted to slidably engage the aligned passages of both the upstream and downstream sections, thereby bridging the gap between the manifold sections. The downstream end of the valve body channel is constructed with a conical valve seat to receive the upstream facing surface of the valve stem. The valve body slides within the manifold to adjust the valve opening, thereby regulating the flow of plastic in the passages. The outer surface of each of the valve bodies is constructed with a flange for engaging a bias spring. The bias spring is constrained between the valve body flange and a portion of the manifold to exert a force on the valve body tending to move the valve body into the open position.

The downstream manifold section may be attached to the die assembly by screws with the valve stems in place within the manifold section passages. The valve bodies are assembled by positioning the valve body assembly so that the valve bodies fit into the passages of the downstream manifold section. The upstream manifold section is positioned to receive the valve bodies.

In order to adjust the position of the valve bodies relative to the valve seat, a lever arm is mounted in the manifold for pivotal movement about a fulcrum positioned intermediate its length. An inner portion of the lever arm engages the valve body flange to cause axial movement of the valve body against the bias spring. Axial movement of the valve body will adjust the clearance between the valve stem and the valve seat and thereby regulate the flow volume in a particular passage. The adjustment levers are actuated by screws located at the outer end of the adjustment lever. The screws extend through the lever and engage a portion of the manifold to provide a pivot force tending to rotate the inner end of the lever against the bias spring in the throttling direction.

BRIEF DESCRIPTION OF THE DRAWINGS

The manifold assembly of this invention is explained in more detail below with reference to the accompanying drawing, in which:

FIG. 1 is a sectional view of an extrusion die using an adjustable inlet manifold; and FIG. 2a is an enlarged sectional view of the manifold of FIG. 1 showing an embodiment of the adjustment mechanism of this application; and FIG. 2b is an enlarged sectional view of the valve mechanism shown in FIG. 2a;

DESCRIPTION OF THE PREFERRED EMBODIMENT

Figure 3A:
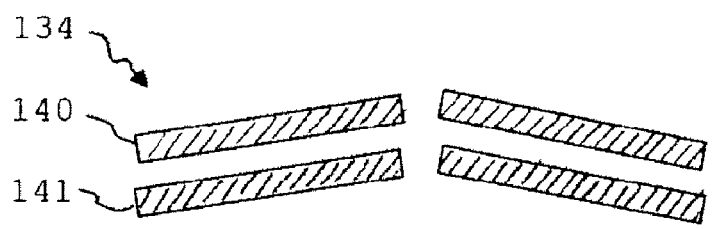
FIG. 3a is a sectional view of a Belleville washer stack, as used in an embodiment of the manifold of FIG. 1.

To illustrate the construction of this invention, an extrusion system 101 is shown in FIG. 1. The system 101 consists of extruders (not shown) having feeds 102 and 103 which supply molten plastic to die assembly 104. In die assembly 104 extrusion passages A and B carry molten plastic to die element 105 where it exits as a multilayered tubular product. Extrusion passages A and B may be fed by a single extruder (not shown). The extrusion system 101 can take many different forms having two or more passages to be supplied by a single extruder, for example, in an embodiment where products are not coaxially layered products, but products that are extruded side by side. In order to provide multiple flows from a single extruder feed 102, in particular the two flows in the embodiment shown in FIG. 1, an input manifold 106 is constructed with an inlet 107 for receiving molten plastic material from extruder feed 102. The inlet 107 splits the flow into a pair of flow passages 108 and 109. Flow passages 108 and 109 are connected to supply flowing plastic to the extrusion passages A and B of die assembly 104. The plastic flow joins in die element 105 to form a multilayered extruded tubular product. Plastic flow through the manifold is from the upstream feed 102 downstream towards the die element 105 as shown by arrows F.

The manifold 106 is constructed of sections 110, and 111 through which the flow passages 108 and 109 extend. The upstream section 110 connects to extruder feed 102 at inlet 107 and serves to divide the flow of plastic into two streams in passages 108 and 109. The manifold sections 110 and 111 are connected by means of a pair of valve bodies 112 and 113, which, as shown in FIG. 2a, are mounted for sliding motion within the portions of flow passages 108 and 109 that are contained within the downstream manifold section 111. Aligned openings to flow passages 108 and 109 are formed at the interface surface 115 of upstream manifold section 110 and downstream manifold section 111 to receive valve bodies 112 and 113. Valve bodies 112 and 113 have drilled flow passages axially extending through the length of the valve bodies to connect the adjoining portions of manifold flow passages 108 and 109.

As best shown in FIG. 2b, the portions of the passages 108 and 109 within the downstream portion of manifold section 111 contain stationery valve stems 116 and 117 positioned along the axis of the respective passage. The valve bodies and valve stems combine to form valve assemblies 130 to provide an adjustable throttle action to the plastic flow within the passages 108 and 109.

The valve assembly 130 of passage 108, as shown in FIGS. 2a and 2b, consists of a valve body 112 and a valve stem 116. Valve body 112 is constructed with a conical seat portion 118 and valve stem 116 is constructed with conically shaped upstream facing surface 120. Valve body 113 of passage 109 is constructed identically having a seat portion 119 and similarly valve stem 117 would have an engaging surface 121. The bodies and stems are positioned in the passages 108 and 109 in axially alignment and are mounted for relative sliding motion within the passages. The relative motion provides an adjustable throttling of the plastic flow in the respective passage. To adjust the flow of plastic within the passages 108 and 109, the valve bodies 112 and 113 are moved axially relative to their respective valve seats 116 and 117. To actuate this motion an adjustment mechanism 129 is provided. Adjustment mechanism 129 consists of a valve body flange 131, lever 132, adjustment screw 133 and spring 134.

Valve body flange 131 is constructed in valve bodies 112 and 113 and extends radially outward to provide a surface to capture spring 134 and to engage the inner end 135 of lever 132.

A pair of levers 132 is mounted on downstream manifold section 111 for pivotal motion about a fulcrum formed by attachment pin 136. Pin 136 is positioned centrally on the lever 132 with inner and outer portions of lever 132 extending on either side of pin 136. The inner end of lever 132 engages an upper surface of flange 131 and provides a force on the valve bodies tending to move the valve bodies axially against spring 134. As shown in the figures, motion of the valve bodies 112 and 113 downward tends to close the valve elements and restrict the flow of plastic in the flow passages 108 and 109. Upward motion will tend to separate the valve elements and open the passages. It should be noticed that the movements of the valve action can be oriented in most any direction depending on the packaging requirement of a particular extrusion application.

Figure 3B:
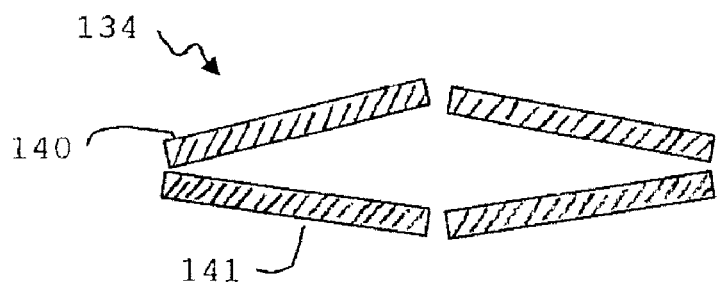
FIG. 3b is a sectional view of a Belleville alternative washer stack, as used in an embodiment of the manifold of FIG. 1.
Figure 3C:
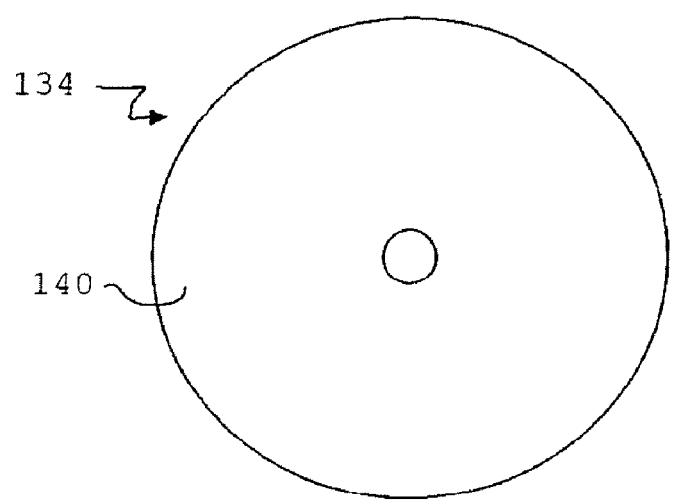
FIG. 3c is a top view of the Belleville washer stack of FIGS. 3a and 3b.

A spring 134 is mounted to engage the lower surface of flange 131 and exert a force that biases the valve bodies 112 and 113 towards the opening direction. As shown, clockwise pivotal motion of lever 132 will oppose the motion of spring 134. Spring 134 may be constructed as a coil spring in one embodiment. In another embodiment spring 134 may be constructed as shown in FIGS. 3a, 3b, and 3c. In the embodiment of FIG. 3, spring 134 consists of a stack of multiple Belleville washers 140 and 141 stacked in axial alignment with the dimpled surface of the spring either parallel, as shown in FIG. 3a, or opposing as shown in FIG. 3b. This type of washer is generally disc shaped with an aperture at its center, as shown in FIG. 3c. The disc is dimpled to provide an axial resilience at a predetermined spring force, as is well known. Although the stack is illustrated for simplicity as a stack of dual spring washers, a person skilled in the art could stack more layers of washers, depending on the performance desired.

In order to position the valve bodies 112 and 113 to accommodate the desired flow requirements, adjustment screw 133 is mounted through a transverse bore 137 in the outer end 138 of lever 132. Transverse bore 137 is threaded to engage screw 133 and allow for movement of screw 133 through lever 132. As shown in FIG. 2, screw 133 extends through lever 132 to abut a surface on manifold section 111. Rotation of screw 133 will tend to pivot lever 132 about pin 136 and move inner end 135 upward or downward. This motion is transmitted through flange 131 to cause axial movement of the valve bodies 112 and 113 with or against spring 134. Screw 133 may be adjusted by any appropriate drive means such as a wrench, screw driver, or other means depending on the drive configuration of the screw.

In this manner a means of providing multiple flow passages from a single plastic feed is constructed having a convenient mechanism for accurately adjusting the flow rate in the multiple flow passages independently.

In the above description, it should be understood that the die assemblies shown are for illustration only and do not form part of this invention which can be used in a wide variety of applications in which there is a need to provide a regulated flow from a single extruder to multiple extrusion channels.

What is claimed:

1. A manifold for distributing flowing plastic from an extruder to multiple extrusion passages of an extrusion die assembly comprising:
   a manifold body having an inlet for receiving said flowing plastic from said extruder, said manifold body constructed with at least two distribution passages each of said passages extending from said inlet to an outlet in a downstream face of said manifold body, said at least two distribution passages being connected to said extrusion die assembly to supply flowing plastic to the passages thereof;
   a valve mounted in each of said at least two manifold distribution passages, constructed with an internal passage extending from an upstream opening to a downstream opening, said valves mounted to form continuous passages with said distribution passages; and
   an adjustment mechanism further comprising:
      a valve body slidably mounted within each of said internal passages having a first valve element;
      a second valve element fixed in said internal passage in a position to engage the first valve element, wherein relative movement of said first and second valve elements operates to adjust the volume of plastic flowing in said internal passages;
      an adjustment lever mounted for pivotal movement about a fulcrum on said manifold and having first and second ends, wherein said first end extends into engagement with the valve body on one side of the fulcrum, and said second end extends to a distal end on the other side of the fulcrum;

an adjuster mounted on said distal end of the lever to cause pivotal movement of the lever about the fulcrum; and a spring operatively engaging said valve body to provide a force tending to move the valve body into an open position, wherein movement of the adjustment lever causes relative movement of said first and second valve elements.

2. The manifold of claim 1, wherein the valve body is constructed with a flange extending outward therefrom, said flange providing a first surface for engaging said first end of said adjustment lever and a second surface for receiving the transmission of the force of said spring.

3. The manifold of claim 1, wherein the spring comprises a coil spring.

4. The manifold of claim 1, wherein the first valve element comprises a valve seat and said second valve element comprises a valve stem.

5. The manifold of claim 1, wherein the adjuster comprises a screw extending through the distal end of the adjustment lever and abutting a surface on the manifold wherein rotation of the screw moves the distal end of the adjustment lever to pivot the adjustment lever.

6. The manifold of claim 1, wherein the spring comprises at least one Belleville washer.

* * * * *